(12) United States Patent
Tamura et al.

(10) Patent No.: US 8,865,280 B2
(45) Date of Patent: Oct. 21, 2014

(54) FUEL HOSE AND METHOD FOR PRODUCING THE SAME

(75) Inventors: Daigo Tamura, Ichinomiya (JP); Ayumu Ikemoto, Komaki (JP); Masashi Noda, Konan (JP); Yoshiki Kodaka, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 68 days.

(21) Appl. No.: 13/454,504

(22) Filed: Apr. 24, 2012

(65) Prior Publication Data

US 2012/0199238 A1   Aug. 9, 2012

Related U.S. Application Data

(63) Continuation of application No. PCT/JP2011/074754, filed on Oct. 27, 2011.

(30) Foreign Application Priority Data

Nov. 9, 2010   (JP) .................................. 2010-250958

(51) Int. Cl.

| | |
|---|---|
| *B32B 1/08* | (2006.01) |
| *B29D 23/00* | (2006.01) |
| *F16L 11/04* | (2006.01) |
| *B32B 25/04* | (2006.01) |
| *C08L 9/02* | (2006.01) |
| *C08K 5/00* | (2006.01) |
| *C08K 5/3465* | (2006.01) |

(52) U.S. Cl.
CPC ............... *F16L 11/04* (2013.01); *B32B 25/042* (2013.01); *B32B 2597/00* (2013.01); *C08K 5/0025* (2013.01); *B32B 2270/00* (2013.01); *C08K 5/3465* (2013.01); *B32B 1/08* (2013.01); *C08L 9/02* (2013.01)
USPC ...... 428/36.91; 428/35.7; 428/36.8; 138/137; 138/141

(58) Field of Classification Search
CPC .... B32B 1/08; B32B 2270/00; B32B 25/042; B32B 2597/00; C08L 9/02; F16L 11/04
USPC ............ 138/137, 140, 141, DIG. 7; 428/36.9, 428/36.91, 422
See application file for complete search history.

(56) References Cited

U.S. PATENT DOCUMENTS

2007/0219333 A1* 9/2007 Shimono et al. ............. 526/249
2007/0231522 A1* 10/2007 Sakazaki et al. ........... 428/36.91

(Continued)

FOREIGN PATENT DOCUMENTS

| JP | 2006234125 A | * | 9/2006 |
|---|---|---|---|
| JP | 2007-015364 A | | 1/2007 |

(Continued)

*Primary Examiner* — Erik Kashnikow
*Assistant Examiner* — Lee Sanderson
(74) *Attorney, Agent, or Firm* — Westerman, Hattori, Daniels & Adrian, LLP

(57) ABSTRACT

A fuel hose according to an aspect of the present disclosure includes: a tubular inner rubber layer; a resin layer formed on an outer circumferential surface of the inner rubber layer; and an outer rubber layer formed on an outer circumferential surface of the resin layer, wherein the inner rubber layer includes a rubber material containing the following Components (A), (B) and (C), the outer rubber layer includes a rubber material containing the following Components (A'), (B) and (C'), and the resin layer includes a resin material containing the following Component (X) as a main component: (A) acrylonitrile-butadiene rubber, (A') blend rubber containing acrylonitrile-butadiene rubber and acrylic rubber, (B) a sulfur vulcanizing agent, (C) an amine catalyst to form bonding points, (C') an amine catalyst to form bonding points, which contains 1,5-diazabicyclo(4.3.0)non-5-ene salt (DBN salt), and (X) tetrafluoroethylene-perfluoro(alkylvinylether)-chlorotrifluoroethylene copolymer.

6 Claims, 1 Drawing Sheet

(56) References Cited

U.S. PATENT DOCUMENTS

2007/0248779 A1    10/2007    Iio et al.
2009/0291243 A1    11/2009    Kitahara et al.

FOREIGN PATENT DOCUMENTS

| | | |
|---|---|---|
| JP | 2007106083 A * | 4/2007 |
| JP | 2007-261079 A | 10/2007 |
| JP | 2008-254178 A | 10/2008 |
| JP | 2010-221578 A | 10/2010 |
| JP | 2010-253729 A | 11/2010 |
| WO | 2009/020182 A1 | 2/2009 |

* cited by examiner

FUEL HOSE AND METHOD FOR PRODUCING THE SAME

BACKGROUND

1. Technical Field

The present disclosure relates to a fuel hose used for, for example, carrying fuel for cars and the like (e.g., gasoline, alcohol blended gasoline (gasohol), alcohol, hydrogen, light oil, dimethylether, LPG, and CNG), and a method for producing the fuel hose.

2. Related Art

In recent years, fuel gas emission regulations of cars have been strict. Thus, it is demanded that the fuel emission amount from a fuel hoses be drastically reduced. Accordingly, a variety of fuel hoses for cars having low permeability have been studied. The fuel hoses as described above are suggested in, for example, Japanese Patent Application Laid-Open No. 2007-261079. The hose disclosed in the Japanese Laid-Open Application has an inner layer, a middle layer (barrier layer) and an outer layer. Materials for the inner layer, the middle layer and the outer layer are acrylonitrile-butadiene rubber (NBR), tetrafluoroethylene-hexafluoropropylene-vinylidene fluoride-perfluoroalkyl vinylether quaternary copolymer (quaternary THV), and blend rubber (NBR-PVC) containing acrylonitrile-butadiene rubber and polyvinyl chloride, respectively. In the above inner layer and outer layer, 1,8-diazabicyclo(5.4.0)undec-7-ene salt (DBU salt) is mixed.

SUMMARY

A fuel hose according to an aspect of the present disclosure includes: a tubular inner rubber layer; a resin layer formed on an outer circumferential surface of the inner rubber layer; and an outer rubber layer formed on an outer circumferential surface of the resin layer, wherein the inner rubber layer includes a rubber material containing the following Components (A), (B) and (C), the outer rubber layer includes a rubber material containing the following Components (A'), (B) and (C'), and the resin layer includes a resin material containing the following Component (X) as a main component: (A) acrylonitrile-butadiene rubber, (A') blend rubber containing acrylonitrile-butadiene rubber and acrylic rubber, (B) a sulfur vulcanizing agent, (C) an amine catalyst to form bonding points, (C') an amine catalyst to form bonding points, which contains 1,5-diazabicyclo(4.3.0)non-5-ene salt (DBN salt), and (X) tetrafluoroethylene-perfluoro(alkylvinylether)-chlorotrifluoroethylene copolymer.

DETAILED DESCRIPTION

Figure 1:
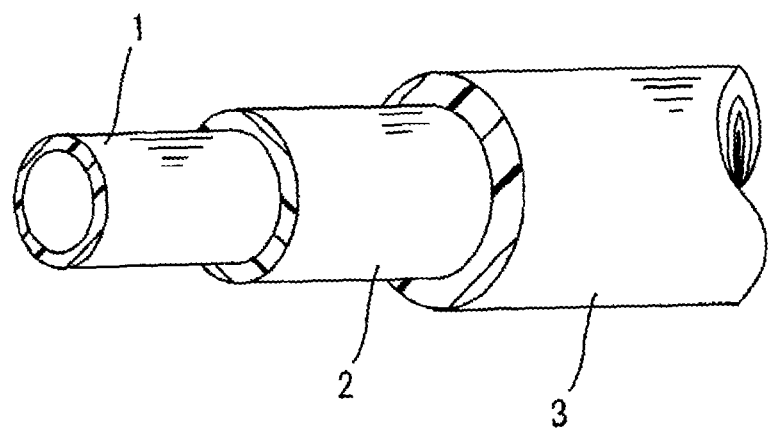
FIG. 1 is a schematic diagram showing an exemplary configuration of the fuel hose of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As a result of repeated experiments to improve fuel permeation resistance (barrier properties) of the fuel hose described in Japanese Patent Application Laid-Open No. 2007-261079, the present inventors found that there was room for improvement of the fuel permeation resistance of the middle layer (barrier layer) containing quaternary THV.

An object of the present disclosure is to provide a fuel hose having excellent fuel permeation resistance and a method for producing the same.

In order to achieve the above object, a fuel hose according to a first aspect of the present disclosure includes: a tubular inner rubber layer; a resin layer formed on an outer circumferential surface of the inner rubber layer; and an outer rubber layer formed on an outer circumferential surface of the resin layer, wherein the inner rubber layer includes a rubber material containing the following Components (A), (B) and (C), the outer rubber layer includes a rubber material containing the following Components (A'), (B) and (C'), and the resin layer includes a resin material containing the following Component (X) as a main component: (A) acrylonitrile-butadiene rubber, (A') blend rubber containing acrylonitrile-butadiene rubber and acrylic rubber, (B) a sulfur vulcanizing agent, (C) an amine catalyst to form bonding points, (C') an amine catalyst to form bonding points, which contains 1,5-diazabicyclo(4.3.0)non-5-ene salt (DBN salt), and (X) tetrafluoroethylene-perfluoro(alkylvinylether)-chlorotrifluoroethylene copolymer.

A second aspect of the present disclosure is a method for producing the fuel hose, including: making bonding points to rubber on the resin layer by promoting dechlorination reactions of Component (X) which forms the resin layer by catalytic action of the Component (C) or (C') at a vulcanization temperature of rubber; and bonding, by using the bonding points of the resin layer, the resin layer to the inner rubber layer and the outer rubber layer.

That is, the present inventors thought of using, as a material for the middle layer (barrier layer), tetrafluoroethylene-perfluoro(alkylvinylether)-chlorotrifluoroethylene copolymer (CPT), which is fluorine resin having a high concentration of fluorine, in place of quaternary THV conventionally used, to obtain a fuel hose having excellent fuel permeation resistance. In the course of experiments on the CPT, the present inventors found that since the fluorine resin concentration of the above CPT is higher than that of quaternary THV, a fuel hose using CPT has high fuel permeation resistance, and that the interlayer bonding between the resin layer (CPT) and the outer rubber layer (NBR-PVC) is poor in the fuel hose using CPT. The reason why the interlayer bonding is poor is uncertain, but can be considered as follows. That is, because 1,8-diazabicyclo(5.4.0)undec-7-ene salt (DBU salt) in the material for the outer rubber layer contributes to promoting dechlorination reactions of PVC, bonding points (cross link points) are hardly formed in dechlorination reactions of CPT. Consequently, the interlayer bonding between the resin layer and the rubber layer is low. The present inventors thought of removing PVC from NBR-PVC used as the material for the outer rubber layer in order to maintain excellent fuel permeation resistance of the above CPT and to improve interlayer bonding. However, when NBR is used as a rubber material, however, ozone resistance is low due to the removal of PVC. Thus, the present inventors focused attention to blend rubber containing acrylonitrile-butadiene rubber and acrylic rubber. The blend rubber has ozone resistance substantially equal to that of NBR-PVC. The present inventors found that the interlayer bonding between the resin layer and the outer rubber layer was improved by using 1,5-diazabicyclo(4.3.0)non-5-ene salt (DBN salt), a stronger base than a DBU salt, in place of the above DBU salt, thereby arriving at the present disclosure. The reason why the interlayer bonding is improved as described above is uncertain, but can be considered as follows. The above dechlorination reactions of CPT are promoted by catalytic action of a DBN salt in an amine catalyst (Component C') to form bonding points at a temperature when rubber is vulcanized with sulfur (vulcanization temperature; generally from 140° C. to 170° C.). Thus, bonding points (cross link points) to rubber are formed on the resin layer. The bonding points (cross link points) of the resin layer and double bond (diene) moieties of the above outer rubber layer are bonded via sulfur. Thus, the interlayer bonding between the resin layer and the outer rubber layer is improved.

In the fuel hose of the present disclosure, CPT having a high concentration of fluorine (Component X) is used as a base of the resin layer. Thus, fuel permeation resistance is improved as compared to when using a conventional quaternary THV. In addition, an amine catalyst to form bonding points is mixed in the inner and outer rubber layers in the fuel hose of the present disclosure. Thus, the above dechlorination reactions of CPT are promoted by the catalytic action of the above amine catalyst to form bonding points at a temperature when rubber is vulcanized with sulfur (vulcanization temperature). By the dechlorination reactions, the bonding points (cross link points) to rubber on the resin layer are formed. The bonding points (cross link points) of the resin layer and double bond (diene) moieties of the above inner and outer rubber layers are bonded via sulfur. Thus, the interlayer bonding between the resin layer and the rubber layers is also improved, and delamination of hoses does not occur. In addition, in the fuel hose of the present disclosure, as a material for the outer rubber layer, blend rubber (Component A') containing acrylonitrile-butadiene rubber and acrylic rubber is used. Thus, acrylic rubber is dispersed in NBR. For this reason, transmission of cracks can be prevented. As a result, the outer rubber layer has ozone resistance substantially equal to that of the rubber layer containing NBR-PVC.

The above blend rubber (Component A') can be also blend rubber (NBR-AEM) containing acrylonitrile-butadiene rubber (NBR) and ethylene acrylic rubber (AEM). When using this rubber, the ozone resistance and interlayer bonding are further improved.

In the above blend rubber (Component A'), a blending ratio of acrylonitrile-butadiene rubber (NBR) and acrylic rubber may be in the range of NBR/acrylic rubber=95/5 to 70/30 in weight ratio. In this case, a balance between the interlayer bonding and ozone resistance is favorable.

The above amine catalyst to form bonding points (Component C') contains 1,8-diazabicyclo(5.4.0)undec-7-ene salt (DBU salt). In this case, the interlayer bonding is further improved.

Further, in the production method of the present disclosure, bonding points (cross link points) are formed on the resin layer by using vulcanization. The bonding points and rubber on both sides of the resin layer are further bonded. In the production method, the resin layer and rubber layers on both sides thereof are bonded as described above. Thus, a hose in which delamination is difficult to occur can be easily produced.

Embodiments of the present disclosure will now be described.

The fuel hose of the present embodiment (the present fuel hose) includes, for example, a hose with a trilayer structure as shown in FIG. 1. The hose includes a tubular inner rubber layer 1 (hereinafter may be referred to as "inner layer"), a resin layer 2 formed on the outer circumferential surface thereof and an outer rubber layer 3 formed on the outer circumferential surface of the resin layer 2 (hereinafter may be referred to as "outer layer").

In the present fuel hose, the above inner layer 1 includes a rubber material containing the following Components (A), (B) and (C), the above outer layer 3 includes a rubber material containing the following Components (A'), (B) and (C'), and further the above resin layer 2 includes a resin material containing the following Component (X) as a main component. Thus, the interlayer bonding between the inner layer 1 and the resin layer 2, and between the resin layer 2 and the outer layer 3 is improved. As a result, the interlayer bonding of the whole hose is improved.

(A) acrylonitrile-butadiene rubber,
(A') blend rubber containing acrylonitrile-butadiene rubber and acrylic rubber,
(B) a sulfur vulcanizing agent,
(C) an amine catalyst to form bonding points,
(C') an amine catalyst to form bonding points containing 1,5-diazabicyclo(4.3.0)non-5-ene salt (DBN salt), and
(X) tetrafluoroethylene-perfluoro(alkylvinylether)-chlorotrifluoroethylene copolymer.

As NBR (Component A) in the rubber material forming the above inner layer 1 (the inner layer material), for example, acrylonitrile-butadiene rubber (NBR) is used from the viewpoint of fuel permeation resistance (barrier properties).

The content of the above NBR (Component A) is generally 40% by weight or more and preferably 50% by weight or more of the whole inner layer material.

As the above NBR, an amount of acrylonitrile (AN) includes middle high amounts of AN, high amounts of AN and extremely high amounts of AN in the NBR. The AN amount in the NBR is preferably in the range of 25 to 60, and particularly preferably in the range of 30 to 55 from the viewpoint of fuel resistance. The extremely high amounts of AN in the NBR has advantages of high gasoline permeation resistance, and good resistance to gasoline and ozone resistance. The middle high amounts of AN in the NBR has an advantage of good gasoline permeation resistance which is a little inferior to that of the high extremely amounts of AN in the NBR.

Next, examples of a sulfur vulcanizing agent (Component B) to be used with the above NBR (Component A) include sulfur. An amount of the sulfur vulcanizing agent (Component B) to be mixed per 100 parts by weight of the above NBR (Component A) is preferably in the range of 0.2 to 5 parts by weight, and particularly preferably in the range of 0.5 to 3 parts by weight.

As the above inner layer material, an amine catalyst to form bonding points (Component C) can be used with, or in place of, NBR (Component A) and a sulfur vulcanizing agent (Component B).

As used herein, an amine catalyst to form bonding points refers to one that has a function of forming bonding points (cross link points) to rubber on the resin layer 2 by promoting dechlorination reactions of CPT in the above resin layer 2 at a temperature when rubber is vulcanized with sulfur (vulcanization temperature; generally from 140° C. to 170° C.).

As the amine catalyst to form bonding points (hereinafter simply abbreviated as "amine catalyst") (Component C), for example, 1,8-diazabicyclo(5.4.0)undec-7-ene salt (DBU salt) and 1,5-diazabicyclo(4.3.0)non-5-ene salt (DBN salt) are used. These are used independently or in combination of two or more. Among these, the amine catalyst is preferably a DBU salt from the viewpoint of bonding to the resin layer 2.

Examples of the above DBU salt include carboxylate of DBU and a phenol resin salt of DBU. The above carboxylate of DBU is preferably naphthoate or sorbate of DBU. These are used independently or in combination of two or more. Among these, a DBU salt is preferably naphthoate of DBU (DBU naphthoate) from the viewpoint of bonding to the resin layer 2. Examples of the above DBN salt include carboxylate of DBN and a phenol resin salt of DBN. The above carboxylate of DBN is preferably naphthoate or sorbate of DBN. These are used independently or in combination of two or more. Among these, carboxylate of DBN is preferably naphthoate of DBN (DBN naphthoate) from the viewpoint of bonding to the resin layer 2.

An amount of the above amine catalyst (Component C) to be mixed per 100 parts by weight of the above NBR (Component A) is preferably in the range of 1 to 20 parts by weight, and particularly preferably in the range of 1 to 10 parts by weight. When the amount of the above amine catalyst (Component C) to be mixed is too little, it is difficult to obtain desired interlayer bonding. On the contrary, when the amount of the above amine catalyst (Component C) to be mixed is too much, vulcanization is overly advanced, which may have a negative effect on rubber properties.

As the above amine catalyst (Component C), a DBU salt and a DBN salt can be also used in combination from the viewpoint of interlayer bonding.

In the above inner layer material, carbon black, an acid acceptor, an anti-aging agent, a vulcanization accelerator, a vulcanization aid, a processing aid, a white filler (e.g., talc and clay), a plasticizer, a softener, a coloring agent, an antiscorching agent or the like can be appropriately added to the above Components A, B and C.

The above inner layer material, for example, contains the above Components A, B and C, and also contains, if necessary, carbon black and the like. The inner layer material can be prepared by kneading them using a banbury mixer, a kneader and a roll.

As a resin material forming the above resin layer 2 (the resin layer material), a material containing tetrafluoroethylene-perfluoro(alkylvinylether)-chlorotrifluoroethylene copolymer (Component X) as a main component can be used.

The main component refers to a component that makes up a majority of the resin material. The main component can be also the entire resin material.

In the above resin layer material, a compatibilizing agent, a bond imparting agent, a filler and the like can be appropriately added to CPT (Component X).

As blend rubber (Component A') in the rubber material forming the above outer layer 3 (the outer layer material), blend rubber containing acrylonitrile-butadiene rubber (NBR) and acrylic rubber is used. The blend rubber is particularly preferably blend rubber (NBR-AEM) containing acrylonitrile-butadiene rubber (NBR) and ethylene acrylic rubber (AEM) from the viewpoint of ozone resistance.

In the above blend rubber (Component A'), a blending ratio of NBR and acrylic rubber may be preferably in the range of NBR/acrylic rubber=95/5 to 70/30, and particularly preferably in the range of NBR/acrylic rubber=90/10 to 80/20 in weight ratio. When NBR is too much, ozone resistance tends to worsen. On the contrary, when NBR is too little, the interlayer bonding tends to worsen. Even when AEM is used as acrylic rubber, a blending ratio of NBR and AEM is preferably the same as that of when using acrylic rubber (the same applies to the rest).

The content of the above blend rubber (Component A') in the whole outer layer material is generally 40% by weight or more, and preferably 50% by weight or more.

As a sulfur vulcanizing agent (Component B) used with the above blend rubber (Component A'), the same one as that exemplified in the above inner layer material can be used in the same ratio.

In addition, the amine catalyst (Component C') used with the above blend rubber (Component A') and a sulfur vulcanizing agent (Component B) includes, for example, 1,5-diazabicyclo(4.3.0)non-5-ene salt (DBN salt).

As the above amine catalyst (Component C'), 1,8-diazabicyclo(5.4.0)undec-7-ene salt (DBU salt) can be used in combination with the above 1,5-diazabicyclo(4.3.0)non-5-ene salt (DBN salt) from the viewpoint of the interlayer bonding.

When the above DBN salt and DBU salt are used in combination, a weight ratio of them is preferably in the range of DBN salt/DBU salt=1/10 to 1/0.1, and particularly preferably in the range of DBN salt/DBU salt=1/5 to 1/1.

An amount of the above amine catalyst (Component C') to be mixed varies depending on the content of acrylic rubber in the above blend rubber (Component A'). An amount of amine catalyst to be mixed per 100 parts by weight of the above blend rubber (Component A') is preferably in the range of 1 to 20 parts by weight, and particularly preferably in the range of 1 to 10 parts by weight. When the amount of the above amine catalyst (Component C') to be mixed is too little, it is difficult to obtain desired interlayer bonding. On the contrary, when the amount of the amine catalyst (Component C') to be mixed is too much, vulcanization is overly advanced, which may have a negative effect on rubber properties. Specifically, an amount of the above DBN salt to be mixed per 100 parts by weight of the above blend rubber (Component A') is preferably in the range of 1 to 20 parts by weight, and particularly preferably in the range of 1 to 10 parts by weight. When a DBU salt is used in combination with the above DBN salt, an amount of the DBU salt to be mixed per 100 parts by weight of the above blend rubber (Component A') is preferably in the range of 1 to 20 parts by weight, and particularly preferably in the range of 1 to 10 parts by weight.

In the above outer layer material, carbon black, an acid acceptor, an anti-aging agent, a vulcanization accelerator, a vulcanization aid, a processing aid, a white filler (e.g., talc and clay), a plasticizer, a softener, a coloring agent, an antiscorching agent and the like can be appropriately added to the above Components A', B and C'.

The above outer layer material, for example, contains the above Components A', B and C', and also contains, if necessary, carbon black and the like. The outer layer material can be prepared by kneading them using a banbury mixer, a kneader and a roll.

The present fuel hose can be, for example, produced as described below. First, the inner layer material (rubber material) containing the above Components A to C, the resin layer material (resin material) containing Component X as a main component, and the outer layer material (rubber material) containing Components A', B and C' are each prepared. The inner layer is formed by extruding the above inner layer material. Then, the resin layer material and the outer layer material are each extruded (tandem system) to the outer circumferential surface of the inner layer. A tubular molded product with a trilayer structure is formed. Next, by cutting the molded product, cut pieces having a given length are formed. The cut piece is then injected into a mandrel to be vulcanized (generally at 140° C. to 170° C. for 10 to 60 minutes). The cut piece is then extracted from the mandrel. The fuel hose with a trilayer structure (see FIG. 1) which has the tubular inner layer 1 and, on the outer circumferential surface thereof, the resin layer 2 and the outer layer 3 sequentially formed can be produced. The method for producing the present fuel hose is, however, not limited to the above production method.

In the present fuel hose, an inner diameter of the hose is preferably in the range of 2 to 100 mm, and particularly preferably in the range of 5 to 50 mm.

The present fuel hose is not limited to the trilayer structure shown in FIG. 1. The present fuel hose can have, for example, an innermost layer formed on the inner circumferential surface of the inner layer 1 and/or an outermost layer formed on the outer circumferential surface of the outer layer 3. The present fuel hose can also have bonding layers formed on each interlayer.

EXAMPLES

Examples of the present fuel hose will now be described in conjunction with Comparative Examples. The present fuel hose is, however, not limited to the Examples.

First, the outer layer materials of the fuel hose were prepared to produce hoses in Examples and Comparative Examples. That is, the materials shown in the following Table 1 were mixed in proportions shown in the Table. The outer layer materials were prepared by kneading them using a BANBURY mixer (manufactured by Kobe Steel, Ltd.) and a roll (manufactured by Nippon Roll MFG. Co., Ltd.).

TABLE 1

| | Outer Layer Materials (NBR-AEM) | | | | | | |
|---|---|---|---|---|---|---|---|
| | 1 | 2 | 3 | 4 | 5 | 6 | 7 |
| NIPOL DN003 | 90 | 90 | 80 | 70 | 95 | 69 | 90 |
| VAMAC DP | 10 | 10 | 20 | 30 | 5 | 31 | 10 |
| Stearic Acid Cherry (Beads) | 1 | 1 | 1 | 1 | 1 | 1 | 1 |
| KYOWA MAG 150 | 10 | 10 | 10 | 10 | 10 | 10 | 10 |
| NONFLEX DCD | 2 | 2 | 2 | 2 | 2 | 2 | 2 |
| ANTIGENE 3C | 3 | 3 | 3 | 3 | 3 | 3 | 3 |
| ANTIGENE 6C | 3 | 3 | 3 | 3 | 3 | 3 | 3 |
| DA-500 | — | 2 | 2 | 2 | 2 | 2 | 2 |
| DBN salt | 2.7 | 2.7 | 2.7 | 2.7 | 2.7 | 2.7 | — |
| SHOBLACK N330 | 50 | 50 | 50 | 50 | 50 | 50 | 50 |
| CARPLEX 1120 | 20 | 20 | 20 | 20 | 20 | 20 | 20 |
| ADK CIZER RS107 | 25 | 25 | 25 | 25 | 25 | 25 | 25 |
| Sulfur | 1.5 | 1.5 | 1.5 | 1.5 | 1.5 | 1.5 | 1.5 |
| NOCCELER MSA | 1 | 1 | 1 | 1 | 1 | 1 | 1 |
| NOCCELER MZ | 0.2 | 0.2 | 0.2 | 0.2 | 0.2 | 0.2 | 0.2 |

The above materials shown in Table 1 will be described below.

[NBR]
NIPOL DN003 manufactured by Zeon Corporation
[AEM]
VAMAC DP manufactured by Du Pont
[Sulfur Vulcanizing Agent (Component B)]
Sulfur ("GOLDEN FLOWER" SULFUR POWDER manufactured by Tsurumi Chemical Industry Co., Ltd.)
[Amine Catalyst to Form Bonding Points (Component C')]
<DBN salt> 1,5-diazabicyclo(4.3.0)non-5-ene salt manufactured by Daiso Co., Ltd.
<DBU Naphthoate>
DA-500 manufactured by Daiso Co., Ltd.
[Acid Acceptor]
Magnesium oxide (KYOWA MAG 150 manufactured by Kyowa Chemical Industry Co., Ltd.)
[Processing Aid]
Stearic acid (STEARIC ACID CHERRY (Beads) manufactured by NOF Corporation)
[Thermal and Oxidative Deterioration Inhibitor]
NONFLEX DCD manufactured by Seiko Chemical Co., Ltd.
[Anti-Aging Agent]
ANTIGENE 3C manufactured by Sumitomo Chemical Co., Ltd., and ANTIGENE 6C manufactured by Sumitomo Chemical Co., Ltd.
[Carbon Black]
SHOBLACK N330 manufactured by Cabot Corporation
[Basic Silica]
CARPLEX 1120 manufactured by DSL Japan Co., Ltd.
[Ether Ester Plasticizer]
ADK CIZER RS107 manufactured by Adeka Corporation
[Sulfenamide Vulcanization Accelerator]
N-oxidiethylene-2-benzothiazolyl sulfenamide (OBS) (NOCCELER MSA manufactured by Ouchi Shinko Chemical Industrial Co., Ltd.)
[Thiazole Vulcanization Accelerator]
ZnMBT (NOCCELER MZ manufactured by Ouchi Shinko Chemical Industrial Co., LTD.)

Hoses were then made using the above outer layer materials as described below.

Example 1

Preparation of the Inner Layer Material

NBR Material

The NBR material was prepared by mixing 100 parts by weight of NBR, a rubber component (Component A), (NIPOL DN003 manufactured by Zeon Corporation, the AN amount: 50), 1 part by weight of sulfur, a sulfur vulcanizing agent (Component B), ("GOLDEN FLOWER" SULFUR POWDER manufactured by Tsurumi Chemical Industry Co., Ltd.), 1 part by weight of DBU naphthoate (DA-500 manufactured by Daiso Co., Ltd.), 10 parts by weight of magnesium oxide (KYOWA MAG 150 manufactured by Kyowa Chemical Industry Co., Ltd.), 1 part by weight of stearic acid (STEARIC ACID CHERRY (Beads) manufactured by NOF Corporation), 45 parts by weight of carbon black (SHOBLACK N330 manufactured by Cabot Corporation), 25 parts by weight of basic silica (CARPLEX 1120 manufactured by DSL. Japan Co., Ltd.), 25 parts by weight of an ether ester plasticizer (ADK CIZER RS107 manufactured by Adeka Corporation), and 1 part by weight of a sulfenamide vulcanization accelerator [N-oxidiethylene-2-benzothiazolyl sulfenamide (OBS)] (NOCCELER MSA manufactured by Ouchi Shinko Chemical Industrial Co., Ltd.) and by kneading the mixture using a BANBURY mixer (manufactured by Kobe Steel, Ltd.) and a roll (manufactured by Nippon Roll MFG. Co., Ltd.).

<Resin Layer Material>

A pellet of tetrafluoroethylene-perfluoro(alkylvinylether)-chlorotrifluoroethylene copolymer (CPT) (Component X) (NEOFLON CPT LP-1000 manufactured by Daikin Industries, Ltd.) was produced.

<Production of Hose>

The inner layer was formed by extruding the above inner layer material (NBR material). Next, to the outer circumferential surface thereof, the resin layer material (CPT) and the outer layer material (NBR-AEM material) 1 were each extruded (tandem system). By cutting the resulting molded product, cut pieces having a given length (300 mm) were then formed. The cut piece was then injected into a mandrel to be vulcanized (at 160° C. for 30 minutes). After vulcanization, the cut piece was extracted from the mandrel. In this manner, a hose (24 mm in inner diameter) with a trilayer structure having the tubular inner layer (2 mm thick) and, on the outer circumferential surface thereof, the resin layer (0.1 mm thick) and the outer layer (2 mm thick) sequentially formed, was produced.

Examples 2 to 6, Comparative Example 1

Hoses with a trilayer structure were produced in the same manner as in Example 1 except that the outer layer material was changed to those shown in Table 2 shown below.

Comparative Example 2

A hose with a trilayer structure was produced in the same manner as in Example 1 except that the resin layer material and the outer layer material were changed to those described below.

<Resin Layer Material>

Tetrafluoroethylene-hexafluoropropylene-vinylidenefluoride-perfluoroalkylvinylether quaternary copolymer (quaternary THV) (THV815 manufactured by Dyneon) was used in place of CPT used in Examples.

<Preparation of the Outer Layer Material (NBR-PVC)>

The NBR-PVC material was prepared by mixing 100 parts by weight of Nipol 1203 JNS as NBR-PVC [NBR/PVC=70/30 (in weight ratio), the AN amount: 33.5] manufactured by Zeon Corporation, 1 part by weight of stearic acid (STEARIC ACID CHERRY (Beads) manufactured by NOF Corporation), 10 parts by weight of magnesium oxide (KYOWA MAG 150 manufactured by Kyowa Chemical Industry Co., Ltd.), 2 parts by weight of DBU naphthoate (DA-500 manufactured by Daiso Co., Ltd.), 30 parts by weight of SRF carbon black (SEAST S manufactured by Tokai Carbon Co., Ltd.), 10 parts by weight of zeolite (MIZUKALIZER DS manufactured by Mizusawa Industrial Chemicals, Ltd.), 20 parts by weight of talc (MISTRON VAPOR TALC manufactured by Nihon Mistron Co., Ltd.), 15 parts by weight of basic silica (CARPLEX 1120 manufactured by DSL. Japan Co., Ltd.), 25 parts by weight of an ether ester plasticizer (ADK CIZER RS107 manufactured by Adeka Corporation), 1 part by weight of sulfur ("GOLDEN FLOWER" SULFUR POWDER manufactured by Tsurumi Chemical Industry Co., Ltd), and 1 part by weight of N-oxidiethylene-2-benzothiazolyl sulfenamide (OBS) as a thiazole vulcanization accelerator (NOCCELER MSA-G manufactured by Ouchi Shinko Chemical Industrial Co., Ltd.) and by kneading the mixture using a BANBURY mixer (manufactured by Kobe Steel, Ltd.) and a roll (manufactured by Nippon Roll MFG. Co., Ltd.).

<Production of Hose>

A hose with a trilayer structure was produced in the same manner as in Example 1 except that the above resin layer material and outer layer material were used.

TABLE 2

|  | Examples | | | | | | Comparative Examples | |
| --- | --- | --- | --- | --- | --- | --- | --- | --- |
|  | 1 | 2 | 3 | 4 | 5 | 6 | 1 | 2 |
| Inner Layer Material | NBR | NBR | NBR | NBR | NBR | NBR | NBR | NBR |
| Resin Layer Material | CPT | CPT | CPT | CPT | CPT | CPT | CPT | Quaternary THV |
| Outer Layer Material (NBR-AEM) | 1 | 2 | 3 | 4 | 5 | 6 | 7 | NBR-PVC |
| Interlayer bonding | ◯ | ◯ | ◯ | ◯ | ◯ | ∆ | X | ◯ |
| Bonding power (N/inch) | 120.0 | 120.0 | 120.0 | 120.0 | 120.0 | 80.0 | 30.0 | 120.0 |
| Ozone test | ◯ | ◯ | ◯ | ◯ | ◯ | ◯ | ◯ | ◯ |
| Fuel permeation resistance | ◯ | ◯ | ◯ | ◯ | ◯ | ◯ | ◯ | X |
| Fuel permeation amount (mg · mm/cm$^2$ · day) | 0.10 | 0.10 | 0.10 | 0.10 | 0.10 | 0.10 | 0.12 | 0.32 |

Properties of hoses of Examples and Comparative Examples obtained above were evaluated according to the following criteria. The results were shown in the above Table 2.

[Interlayer Bonding (Middle Layer/Outer Layer)]

An unvulcanized rubber sheet (size: 100 mm×100 mm, thickness: 2 mm) was produced by processing a rubber material for the outer layer into a sheet using a roll. Resin sheets (size: 100 mm×100 mm, thickness: 0.15 mm) were produced by extruding each resin layer material into a sheet. The above unvulcanized rubber sheet and resin sheet were joined together and the joined sheet was bonded by vulcanization at 160° C. for 45 minutes. The interlayer bonding (N/inch) was then measured by attempting to separate into the rubber sheet and the resin sheet at a rate of 50 mm per minute using a tensile testing machine (JISB 7721).

<Evaluation>
◯: 120.0 (N/inch) or more (material destruction)
Δ: below 120.0 (N/inch) and above 30.0 (N/inch)
x: 30.0 (N/inch) or less

[Ozone Test]

A test piece was produced by molding the rubber material for the outer layer into a sheet 2 mm thick by press vulcanization at 160° C. for 45 minutes. The ozone test was performed using the test piece according to JISK 6259. That is, the 80% elongated test piece was exposed to air containing 50 pphm ozone at 40° C. for 168 hours. The results were evaluated by presence or absence of crack occurrence in the test piece.

<Evaluation>
◯: no cracks
x: crack occurrence

[Fuel Permeation Resistance (Fuel Permeation Amount)]

Figure 2:
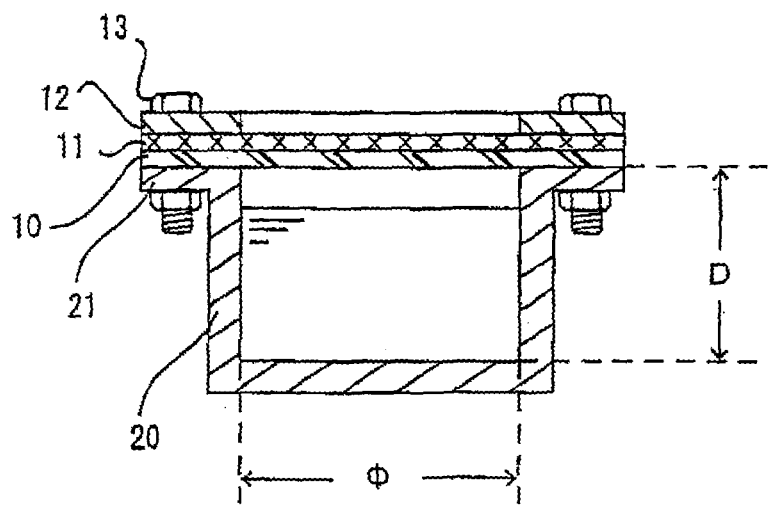
FIG. 2 is an explanatory diagram showing a method for measuring fuel permeation amount (Cup method).

A sample sheet (size: 100 mm×100 mm, thickness: 0.15 mm) was produced by extruding each resin layer material into a sheet. As shown in FIG. 2, a SUS cup with flange (inner diameter φ: 66 mm, height of cup inside D: 40 mm) 20 was prepared. Into the cup 20, 100 ml of a test solution, a mixed solution of Fuel C and ethanol, [Fuel C:ethanol=90:10 (by volume)], was poured. Next, on the flange portion 21 of the above cup 20, the sample sheet 10 produced above was placed. Further, the sample sheet 10 was held by packing 12 via a wire sheet (16 mesh) 11, and it was fixed with a bolt 13, thereby sealing the cup 20. In this manner, a test device was produced to measure fuel permeation amount. Next, the test device turned upside down was left to stand in an oven at 60° C., and the weight of the cup was measured every day. Reduced amounts (Permeation amount Q) of the cup weight were calculated. According to the following formula (1), fuel permeation amount (mg·mm/cm²·day) was calculated (Cup method).

<Evaluation>
◯: 0.12 or less of fuel permeation amount
x: above 0.12 of fuel permeation amount

[Formula 1]

$$\text{Fuel permeation amount (mg·mm/cm}^2 \cdot \text{day)} = \frac{Q \times t}{A \times d} \quad (1)$$

where Q is a permeation amount (mg), t is thickness of a sample sheet (mm), A is a contact area of a sample sheet and a test solution (cm²), and d is test days (day).

As can be seen from the results of the above Table 2, since CPT was used as the resin layer of the hoses in Examples, fuel permeation resistance was excellent. Since NBR-AEM and a DBN salt were also used as the outer layer material of the hoses, the hoses had excellent interlayer bonding and good ozone resistance. In the outer layer materials in Examples 1 to 5, a blending ratio of NBR and AEM was in the range of NBR/AEM=95/5 to 70/30. Meanwhile, in the outer layer material in Example 6, a blending ratio of NBR and AEM deviated from the above range. Examples 1 to 5 were more excellent in interlayer bonding than Example 6.

On the other hand, in Comparative Example 1, since a DBN salt was not used as the outer layer material, Comparative Example 1 was inferior in the interlayer bonding. In Comparative Example 2, since quaternary THV was used as the resin layer material in place of CPT, Comparative Example 2 was inferior in fuel permeation resistance.

The above Examples describe specific embodiments in the present disclosure. The above Examples are, however, presented for illustration purpose only and the present disclosure should not be interpreted to be limited to the Examples. In addition, all changes which come within the range of equivalency of claims are within the scope of the present disclosure.

The fuel hose of the present disclosure is preferably used for a fuel hose for cars. Further, the fuel hose of the present disclosure can be applied to fuel hoses used for tractors, cultivators, mowers, vessels and the like.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A fuel hose, comprising:
a tubular inner rubber layer,
a resin layer formed on an outer circumferential surface of the inner rubber layer;
and an outer rubber layer formed on an outer circumferential surface of the resin layer, wherein the inner rubber layer comprises a rubber material comprising the following Components (A), (B), and (C),
wherein the outer rubber layer comprises a rubber material comprising the following Components (A'), (B), and (C'),
wherein the resin layer comprises a resin material comprising the following Component (X) as a main component:
(A) acrylonitrile-butadiene rubber,
(A') blend rubber comprising acrylonitrile-butadiene acrylic rubber and ethylene acrylic rubber,
(B) a sulfur vulcanizing agent,
(C) an amine catalyst to form bonding points,
(C') an amine catalyst to form bonding points, which comprises 1,5-diazabicyclo(4.3.0)non-5-ene salt and 1,8-diazabicyclo(5.4.0)undec-7-ene salt,
and (X) tetrafluoroethylene-perfluoro(alkylvinylether)-chlorotrifluoroethylene copolymer and wherein the ratio of 1,5-diazabicyclo(4.3.0)non-5-ene salt and 1,8-diazabicyclo(5.4.0)undec-7-ene salt is from 1/10 to 1/0.1,
and wherein in the Component (A') the blending ratio of acrylonitrile-butadiene rubber to acrylic rubber is in the weight ratio of 90/10 to 80/20.

2. The fuel hose according to claim 1, wherein a content Component (A) is 40% by weight or more of the whole inner layer material.

3. The fuel hose according to claim 1, wherein in Component (A') an amount of acrylonitrile in the acrylonitrile-butadiene rubber is in the range of 25 to 60 weight percent.

4. The fuel hose according to claim 1, wherein an amount of Component (B) to be mixed per 100 parts by weight of Component (A) is in a range of 0.2 to 5 parts by weight.

5. The fuel hose according to claim 1, wherein an amount of Component (C) to be mixed per 100 parts by weight of the Component (A) is in the range of from 1 to 20 parts by weight.

6. The fuel hose according to claim 1, wherein an amount of Component (C') to be mixed per 100 parts by weight of Component (A') is in the range of from 1 to 20 parts by weight.

* * * * *